(12) United States Patent
Thomas et al.

(10) Patent No.: US 11,796,675 B2
(45) Date of Patent: Oct. 24, 2023

(54) LOW DRAG DIPPING SONAR

(71) Applicant: THALES, Courbevoie (FR)

(72) Inventors: Philippe Thomas, Brest (FR); François Warnan, Brest (FR)

(73) Assignee: THALES, Courbevoie (FR)

( * ) Notice: Subject to any disclaimer, the term of this patent is extended or adjusted under 35 U.S.C. 154(b) by 211 days.

(21) Appl. No.: 17/617,880

(22) PCT Filed: May 11, 2020

(86) PCT No.: PCT/EP2020/062986
§ 371 (c)(1),
(2) Date: Dec. 9, 2021

(87) PCT Pub. No.: WO2020/249334
PCT Pub. Date: Dec. 17, 2020

(65) Prior Publication Data
US 2022/0308209 A1    Sep. 29, 2022

(30) Foreign Application Priority Data
Jun. 13, 2019   (FR) ................................ 1906286

(51) Int. Cl.
*G01S 15/88*   (2006.01)
*G01S 7/521*   (2006.01)
*G10K 11/00*   (2006.01)

(52) U.S. Cl.
CPC .............. *G01S 15/88* (2013.01); *G01S 7/521* (2013.01); *G10K 11/006* (2013.01)

(58) Field of Classification Search
CPC ........ G01S 15/88; G01S 7/521; G10K 11/006
USPC ........................................... 367/93
See application file for complete search history.

(56) References Cited

U.S. PATENT DOCUMENTS

| | | | |
|---|---|---|---|
| 3,237,151 A | 2/1966 | Thorpe | |
| 6,069,842 A * | 5/2000 | Peynaud | G01S 15/42 367/106 |
| 6,233,202 B1* | 5/2001 | McDonald | G10K 11/006 367/5 |
| 2007/0022937 A1* | 2/2007 | Wallace | B63G 8/24 114/333 |
| 2016/0327640 A1* | 11/2016 | Seite | G01S 7/521 |
| 2017/0284795 A1* | 10/2017 | Carlson | B64D 1/22 |

FOREIGN PATENT DOCUMENTS

| | | |
|---|---|---|
| EP | 0 365 408 A1 | 4/1990 |
| JP | 4-332894 A | 11/1992 |
| WO | 2015/092066 A1 | 6/2015 |

* cited by examiner

*Primary Examiner* — Kerri L McNally
(74) *Attorney, Agent, or Firm* — BakerHostetler

(57) ABSTRACT

A low-drag dipping sonar includes an antenna equipped with acoustic transmitters and receivers. The dipping sonar further comprises a motorized winch comprising a reel, and an actuator configured to rotate the reel and a cable wound on the reel, in that the winch is placed in the antenna, and in that the cable allows the antenna to be hooked to a carrier at its one free end of the cable.

7 Claims, 4 Drawing Sheets

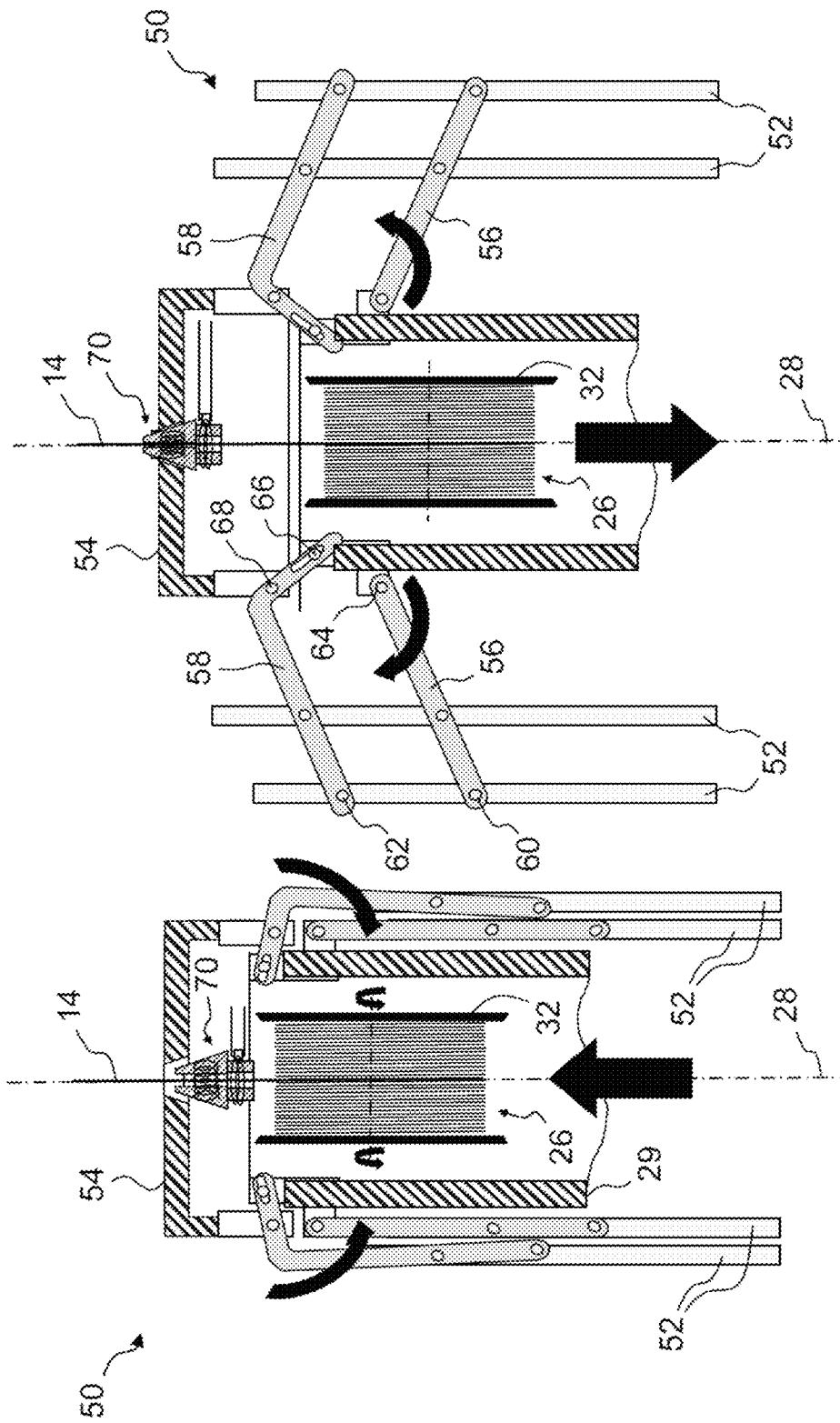

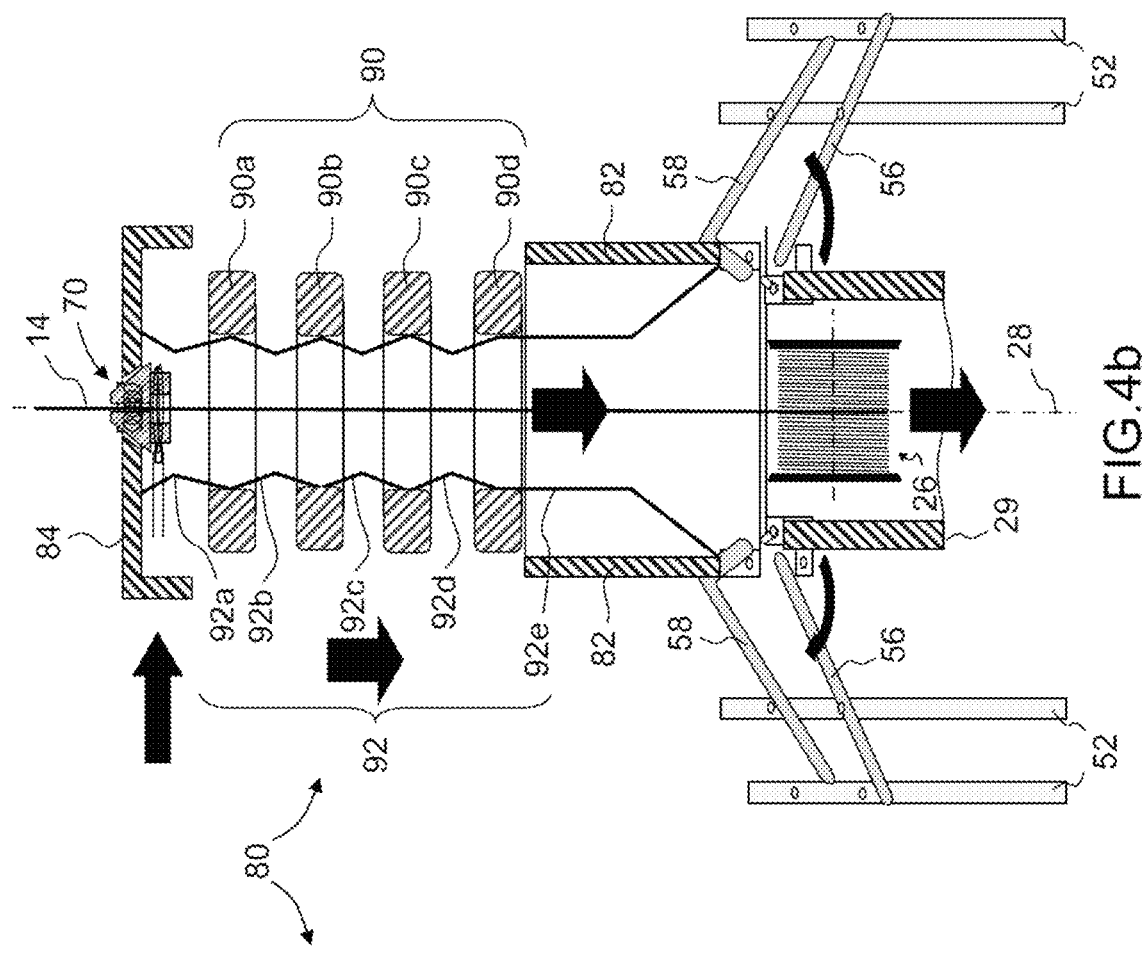
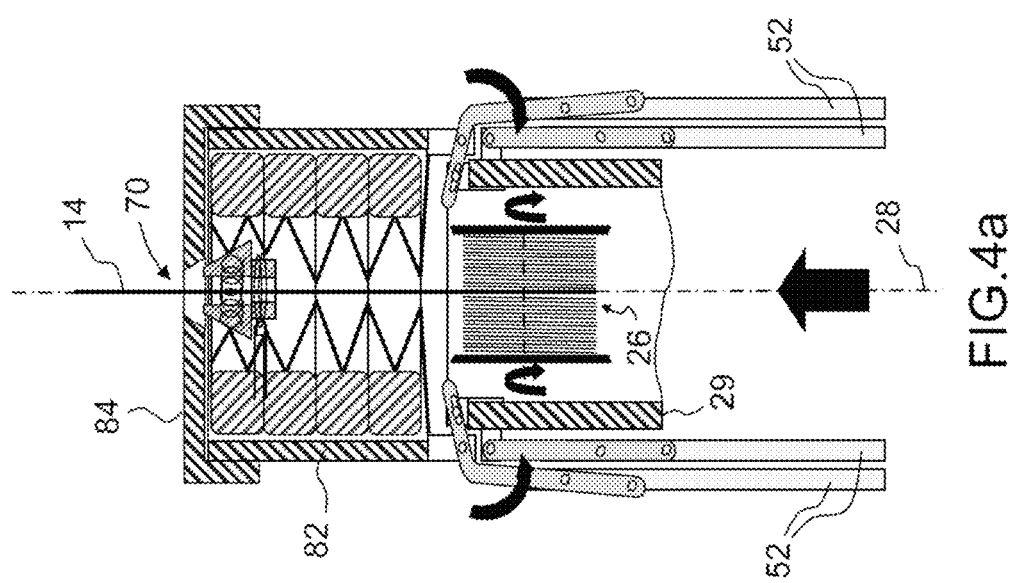

LOW DRAG DIPPING SONAR

CROSS-REFERENCE TO RELATED APPLICATIONS

This application is a National Stage of International patent application PCT/EP2020/062986, filed on May 11, 2020, which claims priority to foreign French patent application No. FR 1906286, filed on Jun. 13, 2019, the disclosures of which are incorporated by reference in their entirety.

The present invention relates to the general field of sonar detection, in particular sonar detection implemented in anti-submarine warfare. It more particularly relates to the field of airborne dipping sonars deployed from a helicopter or drone.

BACKGROUND

In the context of anti-submarine warfare, in order to be able to detect submerged submarines in a given region, sonars, in particular active sonars, are generally employed. In this context, the deployment of sonars from airborne platforms (helicopters or drones) has proven to be especially effective, as such platforms are highly mobile with respect to submarines.

More precisely, helicopters are used to deploy sonar transmitters and receivers that are linked by a cable to their platform (in other words the helicopter). These are then referred to as "dipping sonars". In the rest of this text, the submerged cable-linked sub-assembly is called an antenna. It comprises the actual sonar transmitters and receivers, and potentially electronic equipment associated with the transmitters and receivers. It may also comprise environmental sensors.

As known, a winch located inside the helicopter is used to drop the antenna into the water from the platform, to control the depth of the antenna in the water and to recover the antenna.

When lowering and raising the antenna by means of the winch, the cable generates significant drag in the water. This drag increases with the depth reached by the antenna, because of the length of unwound cable. The speed at which the antenna is lowered and raised is thus limited by the drag generated by the movement of the cable. The larger the depth, the slower the speed at which the antenna must be lowered, because the antenna is drawn downward only by its weight minus its own drag and the drag of the cable. When the antenna is raised, the winch must exert, on the cable, a force equal to the weight of the antenna plus the overall drag. A winch capable of handling a substantial drag might be used. The cable has to be dimensioned to withstand the tensile force exerted by the winch. The higher this force, the larger the cross-sectional area of the cable must be, this further tending to increase drag.

SUMMARY OF THE INVENTION

The invention aims to make a detection operation by means of a dipping sonar independent of the drag of the cable. By detection operation, what is meant is the actions of lowering the antenna, of carrying out the actual acoustic detection phase, and of raising the antenna.

To this end, the subject of the invention is a dipping sonar comprising an antenna equipped with acoustic transmitters and receivers. The dipping sonar further comprises a motorized winch comprising a reel, an actuator configured to rotate the reel and a cable wound on the reel. The winch is placed in the antenna and the cable allows the antenna to be hooked to a carrier at a free end of the cable.

The antenna may comprise deployable arms on which the acoustic receivers are placed, the deployable arms being hinged with respect to a casing of the antenna, and a body that is able to move translationally with respect to the casing along a main axis of the cable. The arms are then hinged with respect to the body. In a first position of the body, in its translation with respect to the casing, the arms are folded against the casing, and in a second position of the body, in its translation with respect to the casing, the arms are deployed.

The antenna may comprise a plurality of rings each bearing acoustic transmitters, and a body that is able to move translationally with respect to the casing along a main axis of the cable. The rings and the body are advantageously joined to one another by means of extensible links. In a first position of the body, in its translation with respect to the casing, the rings and the body make contact with one another, and in a second position of the body, in its translation with respect to the casing, the rings and the body are distant from one another.

The body is advantageously equipped with a clamp configured to clamp the cable, allowing, in an open position of the clamp, the body to occupy its first position and allowing, in a closed position of the clamp, the body to occupy its second position.

The antenna advantageously comprises a battery and means for recharging the battery not through the cable, the battery allowing the acoustic transmitters and the actuator to be supplied with power.

The antenna advantageously comprises at least one energy converter allowing either the acoustic transmitters or the actuator to be supplied with power.

The energy converter is advantageously two-way allowing either the battery to supply the actuator with power or the actuator to recharge the battery.

BRIEF DESCRIPTION OF THE DRAWINGS

The invention will be understood better and further advantages will become apparent from reading the detailed description of an embodiment given by way of example, this description being illustrated by the appended drawing, in which:

FIGS. 3a and 3b show a second variant embodiment of an antenna of the dipping sonar of FIGS. 1a and 1b;

FIGS. 4a and 4b show a third variant embodiment of an antenna of the dipping sonar of FIGS. 1a and 1b;

For the sake of clarity, elements that are the same have been designated with the same references in the various figures.

DETAILED DESCRIPTION

Figure 1A:
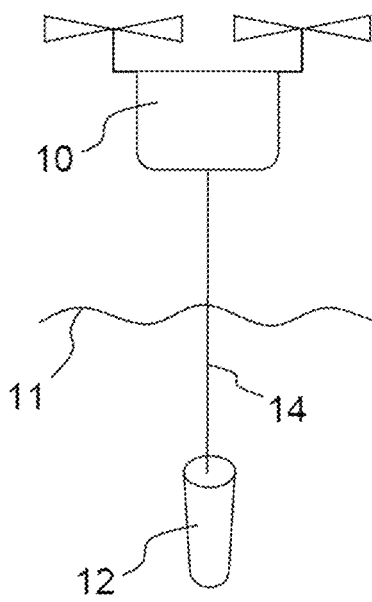
FIGS. 1a and 1b show various carriers each equipped with one dipping sonar.
Figure 1B:
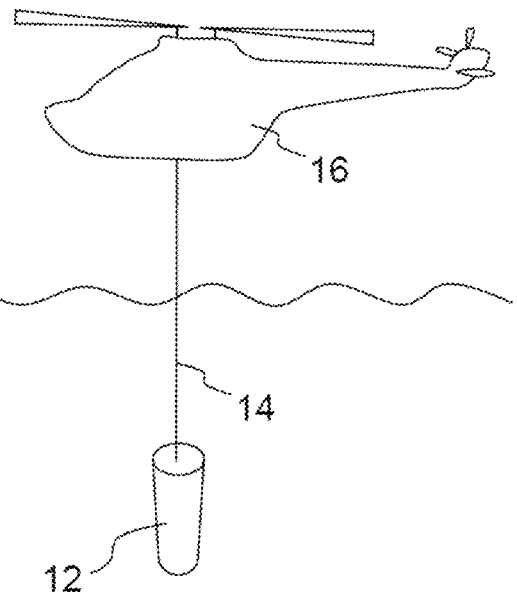

FIG. 1a shows a drone 10 hovering above water, the surface of which has been given the reference number 11. The drone 10 is equipped with an active dipping sonar comprising an antenna 12 hooked to the drone 10 by a cable 14. This type of sonar in particular allows submarine objects to be detected and classified. FIG. 1b shows a helicopter 16 also equipped with an active dipping sonar comprising the antenna 12 hooked to the helicopter 16 by the cable 14. Generally, within the context of the invention, any type of carrier capable of positioning itself above water may be equipped with an active dipping sonar. The carrier is able to lower the antenna to a desired depth under water, to conduct the acoustic detection phase, and to raise the antenna in order to complete its mission or in order to carry out other detection operations.

Figure 2:
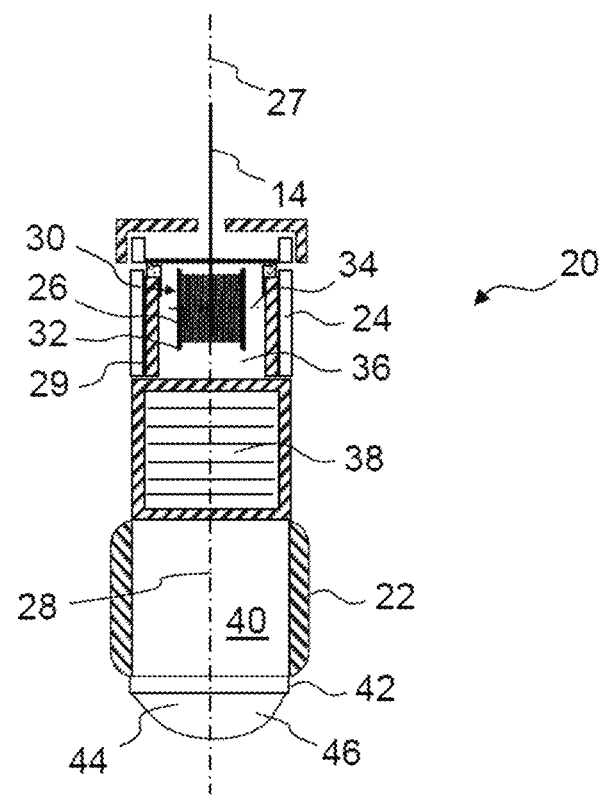
FIG. 2 shows a first variant embodiment of an antenna of the dipping sonar of FIGS. 1a and 1b.

FIG. 2 shows a first variant embodiment of an antenna 20 of an active dipping sonar according to the invention. The antenna 20 is equipped with acoustic transmitters 22, acoustic receivers 24 and a motorized winch 26. The winch 26 is used to wind and unwind the cable 14. A free end 27 of the cable 14 allows the antenna 20 to be hooked to the carrier, such as the drone 10 or the helicopter 16. The antenna 20 extends along an axis 28 that is vertical when the antenna 20 hangs by the cable 14 and is only subjected to gravity. The antenna 20 has a shape that is substantially of revolution about the axis 28. The acoustic transmitters 22 and the acoustic receivers 24 are placed radially around the axis 28.

The acoustic transmitters 22 and the acoustic receivers 24 may be fastened to a casing 29 of the antenna 20. The acoustic transmitters 22 and the acoustic receivers 24 may be placed in separate regions of the antenna 20, the regions being superposed on each other as shown in FIG. 2. Alternatively, the regions may be interspersed, as for example described in the patent application published under No. WO2015/092066 and filed in the name of the applicant.

The winch 26 is motorized by means of an actuator 30. More precisely, the actuator 30 allows a reel 32 on which the cable 14 is wound to be rotated. The actuator 30 may be an electric or hydraulic motor, or more generally a motor employing any form of energy able to operate in a confined space without air renewal. It is advantageously located inside the reel 32 in order to free up space in the antenna 20. The cable 14, as regards its unwound portion, extends along the vertical axis 28. The antenna 20 hangs under the effect of gravity. In FIG. 2, the reel 32 rotates around a horizontal axis 34. Alternatively, the cable 14 may be wound around a reel with a vertical axis. A traverse-winding mechanism allows the cable 14 to be tidily stowed on the reel 32. The traverse-winding mechanism makes a cable guide perform a back-and-forth translational movement along the axis of the reel, in order to tidily stow the cable 14 in successive layers on the reel 32. In the case of a vertical-axis reel, the reel may remain stationary, and the traverse-winding mechanism then rotates around the reel in addition to making its translational movement. Such mechanisms in particular exist in fishing reels. Alternatively, the reel may rotate about its axis and the guide of the traverse-winding mechanism move only translationally with respect to a casing 29 of the antenna 20.

The winch 26 formed from the reel 32 and from the actuator 30 is placed inside the antenna 20, for example in an internal volume 36 located between the acoustic receivers 24.

The antenna 20 also comprises electronic modules 38 in particular allowing the acoustic signals transmitted by the transmitters 22 to be generated, the acoustic signals received by the receivers 24 to be processed, and the actuator 30 to be driven.

The electrical power necessary for the operation of all the components of the antenna 20 may come from the carrier and be delivered via the cable 14. However, this solution requires the cross-sectional area of the cable 14 to be increased if all the necessary power is to be delivered. In particular, the acoustic transmitters need to be supplied with a high instantaneous power, which may be of the order of several kilowatts. Since the cable 14 may be more than several hundred meters in length, it is then necessary to provide a cable the cross-sectional area of which is large enough to limit the effects of ohmic losses along the cable 14. This tends to increase the dimensions of the reel 32, which must be able to accommodate almost all of the length of the cable 14. In addition, during acoustic transmission phases, the transmission of data through the cable must be interrupted to prevent any corruption of the data by the transmission of power through the cable 14.

To limit periods of high power transfer through the cable 14, it is advantageous for the antenna 20 to be equipped with a battery 40, which is advantageously placed in a lower portion of the antenna 20, or at the very least under the volume 36 containing the winch 26, in order to allow the antenna to preserve a better vertical orientation, in particular during lowering when it hangs by the cable 14. The battery 40 may be intended to smooth the transfer of electrical power through the cable 14, this making it possible to decrease the cross-sectional area of the electrical conductors of the cable 14. To this end, the battery 40 may supply power to the acoustic transmitters 22 which, conventionally, transmit at high power for a small fraction of the duration of a mission. It is also advantageous to completely dispense with power transfer through the cable 14. The battery 40 then supplies power to all the electrical loads of the antenna, such as in particular the winch 26, the electronic modules 38, and the acoustic transmitters 22 and receivers 24. To recharge the battery 40, the antenna comprises recharging means that are independent of the cable 14, such as for example a specific connector or a recharging region 42 that is contactless, and for example inductive. The battery 40 may be recharged on board the carrier 10 or 16 by connecting the specific connector or by placing the region 42 near a dedicated inductor.

The antenna 20 may also comprise environmental sensors such as a sounder 44 allowing the distance from the antenna 20 to the seabed to be determined, and a temperature sensor 46 allowing the variation in the temperature of the water as a function of the depth reached by the antenna 20 to be measured. Specifically, the propagation of sound waves in water depends on the variation in the temperature of the water. These sensors may also be powered by the battery 40.

FIGS. 3a and 3b show a second variant embodiment of the antenna 50 of an active dipping sonar according to the invention. In this variant, during sonar reception, the acoustic receivers 24, which are possibly placed on arms, are deployed away from the casing 29 of the antenna 50. In contrast, during operation of the winch 26, the acoustic receivers 24 are tidily stowed against the casing 29 in order to limit the drag of the antenna 50 while the antenna 50 is being lowered and raised in the water. This type of deployable antenna has already been developed by the applicant. In this type of antenna, the acoustic receivers are deployed by means of an electromechanical mechanism placed in the antenna. This mechanism comprises an electric motor that moves arms bearing the acoustic receivers. The motor is actuated both to deploy and to retract the arms. This mechanism is heavy and bulky.

In the general context of the invention, it is possible to keep in the antenna such an electromechanical mechanism for moving arms bearing the acoustic receivers 24. Alternatively, the second variant allows this mechanism to be dispensed with.

The antenna 50 comprises deployable arms 52 on which the acoustic receivers 24 are placed. The arms 52 are advantageously regularly distributed around the axis 28, in order to ensure complete acoustic detection around the axis 28. FIG. 3a partially shows the antenna 50, the arms 52 being folded against the casing 29. FIG. 3b also partially shows the antenna 50, the arms 52 being deployed away from the casing 29. The arms 52 are hinged with respect to the casing 29 and with respect to a body 54 forming an annulus-shaped cover that is able to move translationally with respect to the casing 29 along the axis 28. The body 54 is for example of revolution about the axis 28 and the cable 14 passes through the body 54 via the hole in the annulus.

These two hinges allow the arms 52 to move away from or come closer to the casing 29 during the movement of the body 54. More precisely, in the position of the body 54 shown in FIG. 3a the arms 52 are folded against the casing 29, and in the position of the body 54 shown in FIG. 3b the arms 52 are deployed away from the casing 29.

The arms 52 may be hinged directly to the casing 29 and to the body 54 by means of pivot links. Once deployed, the arms 52 lie horizontal or are inclined with respect to the axis 28. The movement of this type of mechanism is very simple. It is in particular employed in sonar buoys, in which the carrier floats on the surface of the water. However, this orientation of the arms may degrade the acoustic detection when the carrier is a drone or a helicopter. Specifically, in this orientation, the acoustic receivers 24 are affected by the noise generated by the carrier. It may therefore be preferable to make provision for the arms 52 to have a vertical orientation when they are deployed. In other words, it may be desirable to keep the arms parallel to the axis 28 during the translation of the body 54. To do this, the arms 52 may be hinged by way of a four-bar linkage. More precisely, two bars 56 and 58 having parallel segments are hinged on the one hand to an arm 52, by means of links 60 and 62, respectively, and on the other hand to the casing 29, by means of links 64 and 66, respectively. One of the bars, the bar 58 in the example shown, is hinged to the body 54, by means of the link 68, at a point located away from the point where the bar is hinged to the arm 52, and away from the point where the bar is hinged to the casing 29. Thus, when the body 54 moves translationally, the bar 58 pivots about its hinge to the casing 29 and drives the arm 52. The bar 56 is driven by the arm 52 and also pivots with respect to the casing 29. During this movement, the orientation of the arm 52 with respect to the casing 29 does not vary. In the example shown, the arm 52 remains parallel to the axis 29. As shown, it is possible to hinge a plurality of arms 52, two in the example shown, to the same two bars 56 and 58. More precisely, each of the two arms 52 is hinged to the bar 58 and to the bar 56. As specified above, the antenna 50 may be equipped with a plurality of arms 52 distributed around the axis 28. To bear these various arms 52, the antenna 50 is equipped with a plurality of series of two bars 56 and 58 that are also distributed radially around the axis 28.

The translational movement of the body 54 with respect to the casing 29 may be achieved by means of an electromechanical actuator that ensures this movement directly. The actuator is for example formed from a linear hydraulic cylinder the body of which is fastened to the casing 29 and the rod of which, which moves translationally with respect to the body of the hydraulic cylinder, is fastened to the body 54. The inverse configuration is also possible.

Advantageously, it is possible to dispense with an actuator between the casing 29 and the body 54, by using the forces due to gravity exerted on the casing 29 and on the body 54. Specifically, the casing 29 may contain heavy components of which advantage may be taken to deploy the arms 52. To do this, the body 54 is equipped with a clamp 70 that is configured to clamp the cable 14 and to immobilize it with respect to the body 54. The clamp 70 may be actuated by an electromechanical actuator. This actuator, which is joined to the body 54, consumes significantly less power than an actuator directly ensuring the movement of the body 54 with respect to the casing 29.

In the open position of the clamp 70, the cable 14 is free with respect to the body 54 and its weight, associated with that of the arms 52 via the hinge 68, drives the body 54 downward, i.e. toward the casing 29. In this position, the arms 52 are also driven downward, i.e. to the position folded against the casing 29. This position (clamp open) is shown in FIG. 3a.

In the closed position of the clamp 70, the cable 14 is immobilized with respect to the body 54. In this position, it is possible to activate the winch 26 so as to unwind the cable and thus allow the casing 29 and the equipment fastened thereto to be lowered with respect to the body 54 under the effect of gravity. This relative movement of the body 54 with respect to the casing 29 causes the arms 52 to be deployed to the position shown in FIG. 3b. This is possible if the arms 52, and where appropriate the bars 56 and 58, are lighter than the casing 29 and all the components that are fastened thereto. This condition is generally easily met due to the presence of heavy components, in particular the battery 40 and the winch 26, in the casing 29. The activation of the winch 26 with a view to unwinding the cable 14 after the clamp 70 has been closed is carried out in a manner that is coordinated with the relative movement of the body 54 with respect to the casing 29. More precisely, the length of cable unwound is substantially equal to the length of the translation of the body 54 with respect to the casing 29. Unwinding a longer length of cable would run the risk of causing the presence of slack cable between the reel 32 and the clamp 70. Unwinding a shorter length of cable would not allow the arms 52 to be completely deployed. It is possible to control the deployment of the arms 52 by activating the winch 26.

The clamp 70 comprises a fixed portion that is securely fastened to the body 54, and a portion that is movable with respect to the fixed portion and that makes contact with the cable 14. The fixed portion of the clamp 70 may be securely fastened to the body 54 or optionally float. More precisely, in the open position of the clamp 70, the fixed portion may preserve at least one degree of translation freedom along the axis 28 with respect to the body 54. This degree of freedom facilitates closure of the clamp 70 when the antenna 50 is being lowered or raised. This degree of freedom allows the friction between the movable portion and the cable 14 during closure of the clamp 70 to be limited.

FIGS. 4a and 4b represent a third variant embodiment of the antenna 80 of an active dipping sonar according to the invention. In this variant, the casing 29 in which the winch 26 is located, and the arms 52 hinged to the casing 29 via the bars 56 and 58, are again present. The arms 52 are shown in the position folded against the casing 29 in FIG. 4a, as was the case for FIG. 3a. Likewise, the arms 52 are shown in the deployed position in FIG. 4b, as was the case for FIG. 3b.

Unlike the second variant, the antenna 80 of the third variant comprises a body with two portions: a lower portion that forms a tube 82 around the axis 28, and that is able to move translationally with respect to the casing 29 along the axis 28; and an upper portion that forms an annulus-shaped cover 84 similar to the body 54. The cable 14 passes through the cover 84, again via the hole in the annulus. The bar 58 is hinged to the tube 82, by means of the link 68, at a point located away from the point where the bar is hinged to the arm 52, and away from the point where the bar is hinged to the casing 29. Thus, when the tube 82 moves translationally, the bar 58 pivots about its hinge to the casing 29 and drives the arm 52.

The cover 84 is able to move translationally with respect to the tube 82 along the axis 28. The cover 84 is connected to the tube 82 by means of an extensible link. The antenna 80 also comprises the clamp 70. As in the second variant, the clamp 70 of the antenna 80 is configured to clamp the cable 14 and thus make it possible to immobilize the cable 14 with respect to the cover 84 when the clamp is closed. In the position of FIG. 4a, the clamp 70 is open and the cover 84 is situated on the tube 82, which is in turn situated on the casing 29. The cover 84 and the tube 82 are driven by gravity. In the position of FIG. 4b, the clamp 70 is closed and gravity drives the casing 29 downward and keeps the cover 84 away from the tube and the tube 82 away from the casing 29.

In the antenna 20, the acoustic transmitters 22 are fastened to the casing 29. The transmitters occupy a predefined height along the axis 28. It may be advantageous to increase this height, in particular to vertically separate the transmitters from one another. However, such a separation also tends to increase the height of the antenna 20 along its axis 28. The antenna 80 is an alternative, allowing a given height to be maintained between the acoustic transmitters during lowering and raising of the antenna, and this height to be increased during the detection phase. In other words, the antenna 80 is configured to allow the transmitters to be deployed along the axis 28 during the detection phase.

To this end, the antenna 80 comprises a plurality of rings 90 each bearing some acoustic transmitters 22. The rings 90 are able to slide along the axis 28 between the casing 29 and the cover 84. The rings 90 are joined to one another by means of links 92 that are extensible along the axis 28. Thus, in the position of FIG. 4a, when the antenna 80 is being lowered or raised toward the carrier, the rings 90 make contact with one another, and are tidily stowed inside the tube 82. In addition, the arms 52 are retracted as in FIG. 3a. In this position, the antenna 80 occupies a compact volume that generates minimal drag when the antenna 80 is lowered or raised. In the position of FIG. 4b, the arms 52 are deployed as in FIG. 3b, and the rings 90 are also deployed. More precisely, the rings 90 are distant from one another. The rings 90 are also distant from the cover 84 and from the tube 82.

In the example shown in FIGS. 4a and 4b, the antenna 80 comprises four rings 90. In FIGS. 4a and 4b the rings 90 have been differentiated between and designated by the references 90a, 90b, 90c and 90d. Likewise, the extensible links 92 have been differentiated between and designated by the references 92a, 92b, 92c, 92d and 92e. Of course, the invention may be implemented regardless of the number of rings 90, with a corresponding number of extensible links. More precisely, an extensible link 92a joins the cover 84 to the ring 90a. An extensible link 92b joins the ring 90a to the ring 90b. An extensible link 92c joins the ring 90b to the ring 90c. An extensible link 92d joins the ring 90c to the ring 90d and an extensible link 92e joins the ring 90d to the tube 82. In the configuration of FIG. 4a the extensible links 92a to 92e are relaxed and allow the rings 90a to 90d to be positioned in contact with one another. In the configuration of FIG. 4b the extensible links 92a to 92e are tautened and allow the rings 90a to 90d to be separated from one another and separated from the cover 84 and from the tube 82. The extensible links 92a to 92e are for example produced by means of straps which in the tautened position determine the spacing of the rings with respect to one another and with respect to the cover 84 and to the tube 82. In the position of FIG. 4a, the straps are simply relaxed and are tidily stowed inside the rings.

Figure 5:
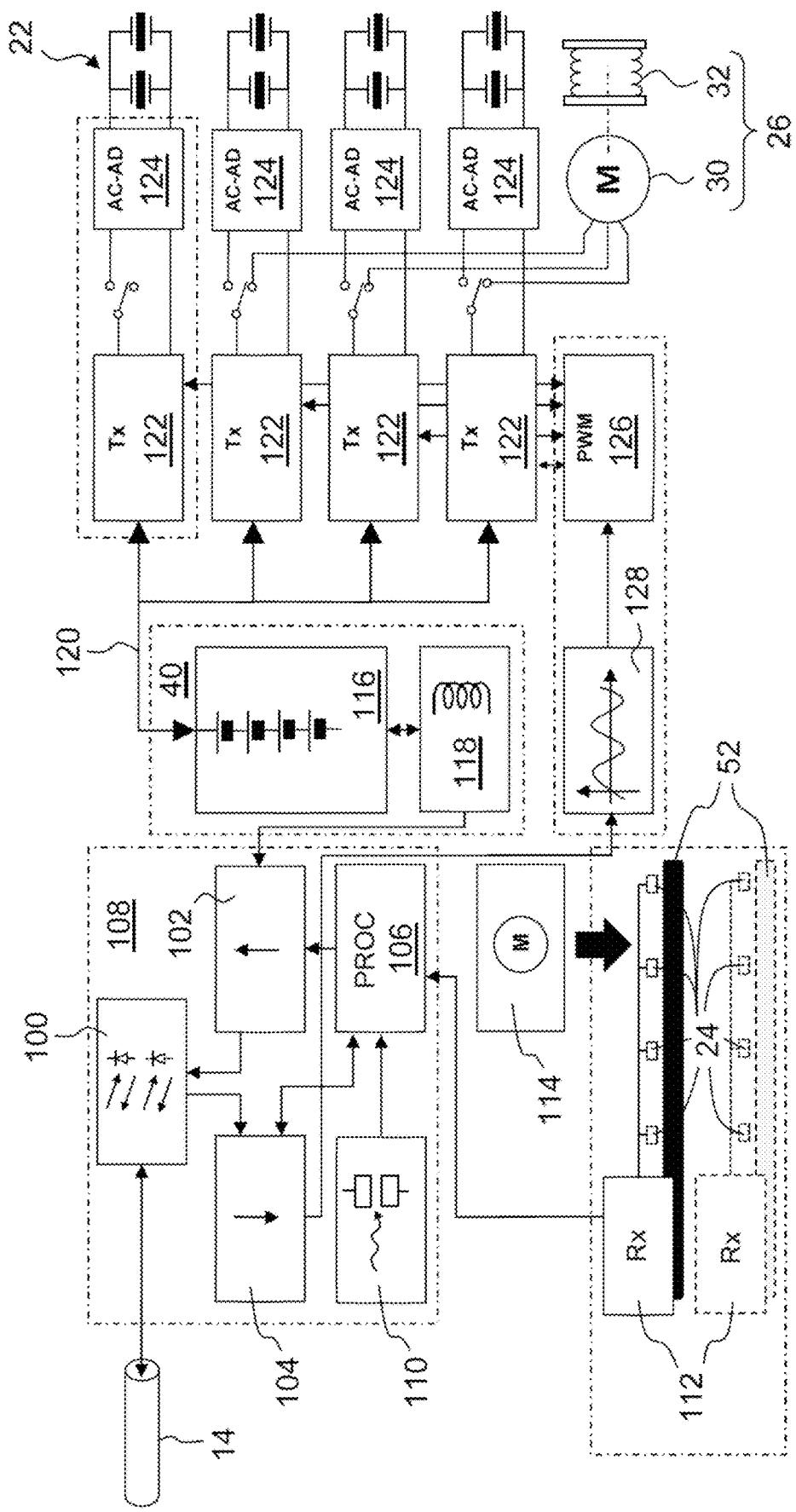
FIG. 5 shows, in the form of a block diagram, an example of the electrical architecture of an antenna of the dipping sonar.

FIG. 5 shows, in the form of a block diagram, an example of an electrical architecture that may be implemented in all the antennas described above. In this example, the battery 40 supplies all the power required by the various electrical loads of the antenna. The antenna is connected to the carrier by means of the cable 14 which, in this example, only conveys information, for example by means of an optical fiber. In the antenna, the optical fiber is connected to an interface module 100 allowing the optical signals conveyed by the optical fiber to be converted into electrical signals. The interface module 100 is itself connected to an uplink interface module 102 for shaping internal antenna electrical signals that are subsequently delivered to the interface module 100. The interface module 100 is also connected to a downlink interface module 104 for shaping electrical signals received from the interface module 100. The two modules 102 and 104 are managed by a processor 106. A printed circuit board 108 may bear the interface modules 100, 102 and 104 and the processor 106. The printed circuit board 108 may also bear the environmental sensors or at the very least an interface module 110 allowing them to be controlled and information that the sensors deliver to be collected.

A plurality of arms 52 each bearing some acoustic receivers 24 are provided. A reception module Rx 112 associated with each arm 52 allows the acoustic signals received from the acoustic receivers 24 to be shaped. The reception module Rx 112 is connected to the processor 106 with a view to transmitting the shaped signals thereto. An actuator 114, which is controlled by the processor 106, allows the arms 52 to be deployed. The actuator 114 may operate the arms 52 directly or open and close the clamp 70.

The battery 40 comprises cells 116 that are able to accumulate or deliver electrical energy, and a managing module 118 for supervising the state of charge of the cells 100. The managing module 118 may also comprise recharging means that are independent of the cable 14, which means have here been represented by an armature winding, and that allow the cells 116 to be recharged contactlessly once the cable 14 has been wound up and the antenna is back in the carrier.

In FIG. 5, a high-voltage DC network 120 is connected to the battery 40. The network 120 mainly allows the acoustic transmitters 22 to be supplied with power, by way of converters Tx 122 and, if necessary, by way of matching units 124 allowing impedance matching with the acoustic transmitters 22. The antenna for example comprises as many converters Tx as there are rings 90. Other networks, in particular low-voltage networks, may also be present in the antenna, in particular with a view to supplying power to the printed circuit board 108 and to other electrical loads that do not require high voltage. In order not to clutter FIG. 5, these other networks have not been shown. The converters Tx 122 are used only for short periods of time and it is advantageous for them to also be used by other loads. More precisely, the acoustic transmissions take place only during the acoustic detection phase, during which the winch 26 remains still. Conversely, when the antenna is lowered or raised under the action of the winch 26, there is neither transmission, nor acoustic reception. It is therefore possible to use the converters Tx 122 outside of the acoustic detection phase, in particular to supply power to the winch 26 and more precisely to its electric motor 30.

The converters Tx 122 are for example inverters that convert the DC voltage of the network 120 into AC voltage either at the frequency of the acoustic waves that it is desired to transmit into the water, or at a frequency compatible with the speed of rotation of the electric motor 30. An inverter is particularly well suited to generating a variable frequency allowing the speed of the electric motor 30 to be continuously varied. The converters are for example controlled via a pulse width modulator PWM 126, which in particular opens and closes electronic switches belonging to the various converters Tx 122. The pulse width modulator PWM 126 may receive a command from a driver module 128. The command is for example an image of the AC signal delivered either to the electric motor 30 or to the acoustic receivers 24.

The converters Tx 122 may be one-way. In other words, the converters Tx 122 merely supply power to the loads assigned thereto. Moreover, while the antenna is being lowered, the electric motor 30 may regenerate electrical power, which it is then necessary to dissipate, for example in an electrical resistor. Alternatively, it is possible to provide two-way converters Tx 122 that allow the battery 40 to be recharged when a regenerative load, in particular the electric motor 30 during lowering, is connected to it. In addition to the option as regards recharging the battery 40 with the electric motor 30 then operating as a generator, it is useful to provide a resistor to allow the regenerated power to be dissipated when the maximum charge of the battery 40 has been reached.

The invention claimed is:

1. A dipping sonar comprising an antenna equipped with acoustic transmitters and receivers, further comprising a motorized winch comprising a reel, an actuator configured to rotate the reel and a cable wound on the reel, in that the winch is placed in the antenna, and in that the cable allows the antenna to be hooked to a carrier at a free end of the cable.

2. The dipping sonar as claimed in claim 1, wherein the antenna comprises deployable arms on which the acoustic receivers are placed, the deployable arms being hinged with respect to a casing of the antenna, and a body that is able to move translationally with respect to the casing along a main axis of the cable, in that the arms are hinged with respect to the body, in that in a first position of the body, in its translation with respect to the casing, the arms are folded against the casing, and in that in a second position of the body, in its translation with respect to the casing, the arms are deployed.

3. The dipping sonar as claimed in claim 1, wherein the antenna comprises a plurality of rings each bearing acoustic transmitters, a body that is able to move translationally with respect to the casing along a main axis of the cable, in that the rings and the body are joined to one another by means of extensible links, in that in a first position of the body, in its translation with respect to the casing, the rings and the body make contact with one another, and in that in a second position of the body, in its translation with respect to the casing, the rings and the body are distant from one another.

4. The dipping sonar as claimed in claim 2, wherein the body is equipped with a clamp configured to clamp the cable, allowing, in an open position of the clamp, the body to occupy its first position and allowing, in a closed position of the clamp, the body to occupy its second position.

5. The dipping sonar as claimed in claim 1, wherein the antenna comprises a battery and means for recharging the battery not through the cable, the battery allowing the acoustic transmitters and the actuator to be supplied with power.

6. The dipping sonar as claimed in claim 5, wherein the antenna comprises at least one energy converter allowing either the acoustic transmitters or the actuator to be supplied with power.

7. The dipping sonar as claimed in claim 6, wherein the energy converter is two-way, allowing either the battery to supply the actuator with power or the actuator to recharge the battery.

* * * * *